(12) United States Patent
Aul et al.

(10) Patent No.: US 9,422,075 B2
(45) Date of Patent: Aug. 23, 2016

(54) PRESSURE PAD AND HEAT-SEALING DEVICE HAVING SUCH A PRESSURE PAD

(71) Applicant: Tetra Laval Holdings & Finance S.A., Pully (CH)

(72) Inventors: Thomas Aul, Eppstein (DE); Ebi Shokri, Taby (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 14/439,921

(22) PCT Filed: Nov. 8, 2013

(86) PCT No.: PCT/EP2013/073417
§ 371 (c)(1),
(2) Date: Apr. 30, 2015

(87) PCT Pub. No.: WO2014/072477
PCT Pub. Date: May 15, 2014

(65) Prior Publication Data
US 2015/0266603 A1    Sep. 24, 2015

(30) Foreign Application Priority Data

Nov. 9, 2012  (SE) ...................................... 1251273

(51) Int. Cl.
*B32B 37/00*      (2006.01)
*B65B 51/30*      (2006.01)
(Continued)

(52) U.S. Cl.
CPC ................. *B65B 51/30* (2013.01); *B29C 65/20* (2013.01); *B29C 65/3656* (2013.01);
(Continued)

(58) Field of Classification Search
CPC ...... B65B 51/30; B30B 15/06; B30B 15/061; B30B 15/062
USPC ............................. 156/580, 581, 583.1, 583.3
See application file for complete search history.

(56) References Cited

U.S. PATENT DOCUMENTS

| 3,830,681 A | 8/1974 | Wilson |
| 3,845,606 A | 11/1974 | Wilson |

(Continued)

FOREIGN PATENT DOCUMENTS

| CN | 1617815 A | 5/2005 |
| DE | 31 41 898 A1 | 5/1983 |

(Continued)

OTHER PUBLICATIONS

International Search Report (PCT/ISA/210) mailed on Feb. 12, 2014, by the European Patent Office as the International Searching Authority for International Application No. PCT/EP2013/073417.

(Continued)

*Primary Examiner* — James Sells
(74) *Attorney, Agent, or Firm* — Buchanan Ingersoll & Rooney PC

(57) ABSTRACT

Pressure pad for a heat-sealing device in a packaging machine, the heat-sealing device having a heat-sealing jaw and a counter-jaw adapted to seal together two surfaces of a packaging material when the jaws are pressed together. The pressure pad comprises a first portion, adapted to be mounted on the counter-jaw of the heat-sealing device, and a second portion, in use arranged towards the heat-sealing jaw of the heat-sealing device. A cross-section of said second portion, along the extension of the pressure pad, has a substantially constant arc-shape of the outer contact surface in use facing the heat-sealing jaw. The pressure pad is made up of a resilient material, and the cross-section of said arc-shaped outer contact surface has a radius of curvature of 15 mm±5 mm. The invention further relates to a heat-sealing device having such a pressure pad.

12 Claims, 2 Drawing Sheets

(51) Int. Cl.
  *B29C 65/36* (2006.01)
  *B29C 65/74* (2006.01)
  *B29C 65/00* (2006.01)
  *B29C 65/20* (2006.01)
  *B29K 705/02* (2006.01)
  *B29L 31/00* (2006.01)

(52) U.S. Cl.
  CPC ........ *B29C 65/3676* (2013.01); *B29C 65/7451* (2013.01); *B29C 66/1122* (2013.01); *B29C 66/4312* (2013.01); *B29C 66/72321* (2013.01); *B29C 66/81422* (2013.01); *B29C 66/81427* (2013.01); *B29C 66/81431* (2013.01); *B29C 66/81457* (2013.01); *B29C 66/8491* (2013.01); *B29C 66/8122* (2013.01); *B29C 66/8322* (2013.01); *B29K 2705/02* (2013.01); *B29L 2031/712* (2013.01)

(56) References Cited

U.S. PATENT DOCUMENTS

| | | |
|---|---|---|
| 5,231,817 A | 8/1993 | Sadler |
| 5,247,779 A | 9/1993 | Wirsig et al. |
| 6,216,420 B1 | 4/2001 | Mazzetto et al. |
| 6,871,476 B2 * | 3/2005 | Tobolka ................ B29C 65/224 493/194 |
| 7,003,934 B1 | 2/2006 | Yano |
| 7,389,623 B2 * | 6/2008 | Yano ........................ B26D 7/20 493/209 |
| 7,640,717 B2 | 1/2010 | Shokri et al. |
| 2005/0241277 A1 | 11/2005 | Yano et al. |
| 2007/0251196 A1 | 11/2007 | Shokri et al. |

FOREIGN PATENT DOCUMENTS

| | | |
|---|---|---|
| EP | 1 300 340 A1 | 4/2003 |
| EP | 1 452 451 A1 | 9/2004 |
| WO | WO 91/08954 A1 | 6/1991 |
| WO | WO 2005/105579 A1 | 11/2005 |

OTHER PUBLICATIONS

International-Type Search Report (PCT/ISA/201) mailed on May 27, 2013, by the Swedish Patent Office as the International Searching Authority for International-Type Search Request No. ITS/SE12/00299.

* cited by examiner

PRESSURE PAD AND HEAT-SEALING DEVICE HAVING SUCH A PRESSURE PAD

FIELD OF THE INVENTION

The present invention relates to a pressure pad in a heat-sealing device for heat sealing a tube of sheet packaging material filled with a pourable food product, and to a heat-sealing device having such a pressure pad.

More specifically, the present invention relates to a pressure pad of a heat-seal device, which may be incorporated in a packaging machine for continuously producing sealed packages of pourable food products from said tube of packaging material, and a heat-sealing device having such a pressure pad.

TECHNICAL BACKGROUND

Many pourable food products, such as fruit juice, pasteurized or UHT (ultra-high-temperature processed) milk, wine, tomato sauce, etc., are sold in packages made of sterilized packaging material.

A typical example of such a package is the parallelepiped-shaped package for liquid or pourable food products known as Tetra Brik® Aseptic, which is formed by folding and sealing a web of laminated packaging material. The packaging material has a multilayer structure comprising a layer of fibrous material, e.g. paper, covered on both sides with heat-seal plastic material, e.g. polyethylene.

In the case of aseptic packages for long-storage products such as UHT milk, the packaging material comprises a layer of oxygen-barrier material, e.g. a sheet of aluminium, which is superimposed on a layer of heat-seal plastic material and is in turn covered with another layer of heat-seal plastic material eventually forming the inner face of the package contacting the food product.

As is known, such packages are made on fully automatic packaging machines, on which a continuous tube is formed from the web-fed packaging material; the web of packaging material is sterilized on the packaging machine itself, e.g. by applying a chemical sterilizing agent, such as a hydrogen peroxide solution, which, after sterilization, is removed, e.g. vaporized by heating, from the surfaces of the packaging material; and the web of packaging material so sterilized is maintained in a closed sterile environment, and is folded and sealed longitudinally to form a tube.

The tube is fed continuously in a first vertical direction, is filled with the sterilized or sterile-processed food product, and is gripped and heat sealed at equally spaced cross sections by means of a heat-seal device.

More specifically, the heat-seal device comprises two or more pairs of jaws, which act cyclically and successively on the tube and heat seal the packaging material of the tube to form a continuous strip of pillow packs connected to one another by respective transverse pressure pads, i.e. extending in a second direction perpendicular to said first direction.

The pillow packs are separated by cutting the respective pressure pads, and are then fed to a final folding station where they are folded mechanically into the finished parallelepiped shape.

The tube portion gripped between each pair of jaws is heat sealed by heating means carried by one of the jaws and for locally melting the two layers of heat-sealable plastic material gripped between the jaws.

More specifically, packaging material in which the layer of barrier material is defined by a sheet of electrically conductive material, e.g. aluminium, is normally heat sealed by a so-called induction heat-seal process, in which, when the tube is gripped by the pair of jaws, electric current is induced in the sheet of aluminium to heat it locally and so locally melt the heat-sealable plastic material.

More specifically, in induction heat sealing, the heating means substantially comprise an inductor, which is carried by one of the two jaws, known as the sealing jaw, is supplied by a high-frequency current generator, and is substantially defined by one or more inducting bars made of electrically conductive material, extending parallel to the second direction, and which interact with and induce an electric current in the tube material to heat it to the necessary heat-seal temperature.

In the most common, known embodiment, the inductor defines, frontally, two straight, elongated active surfaces extending parallel to the second direction and on opposite sides of an intermediate plane perpendicular to the first direction. More specifically, the active surfaces are located in respective front contact surfaces of the sealing jaw, extending on opposite sides of and parallel to said intermediate plane and separated by a central recess, and have continuous or segmented longitudinal projections projecting towards the packaging material.

The other jaw, known as the counter-jaw, has two pressure pads made of elastomeric material, extending on opposite sides of and parallel to the intermediate plane, and having respective flat front contact surfaces, which cooperate with the respective front contact surfaces of the sealing jaw, and therefore with the respective active surfaces of the inductor, to heat seal the tube along respective sealing lines defining the transverse pressure pad. Once the heat-seal operation is completed, a cutting member, carried, for example, by one of the two jaws, normally the counter-jaw, is activated and which interacts with the tube of packaging material to cut the tube along the centreline of the transverse pressure pad between the sealing lines, and so cut a pillow pack off the bottom end of the tube of packaging material. The bottom end being sealed transversely, the jaws, on reaching the bottom dead-centre position, can be opened to avoid interfering with the top portion of the tube.

Though providing for good-quality seals, known heat-seal devices of the above type still leave room for improvement.

In particular, when packaging pourable food products containing small solid particles (e.g. fibres or seeds, as in tomato products), some of the particles may become lodged between the contacting portions of the two sheets of packaging material for sealing, thus locally impairing heat sealing of the packaging material. In which case, depending on the location of the particles trapped in the pressure pad, channels may be formed through the sealed portion, thus endangering the sterility of the package.

In EP 1,300,340 a pressure pad is shown having a constant, relatively small radius of the contact surface. This type of pad has been found to work well in displacing some of the particles from the sealing zone, but it can also cause undue stress to the packaging material.

SUMMARY OF THE INVENTION

It is hence an object of the present invention to provide a pressure pad that at least mitigates some of the above-mentioned problems, by providing a contact surface of the pressure pad having a radius of curvature of 15 mm±5 mm. This has surprisingly been shown to provide a good sealing quality, while also being gentle on the packaging material during the sealing process.

BRIEF DESCRIPTION OF THE DRAWINGS

The invention is more easily understood when read in connection with the drawings, where.

DETAILED DESCRIPTION

Figure 1:
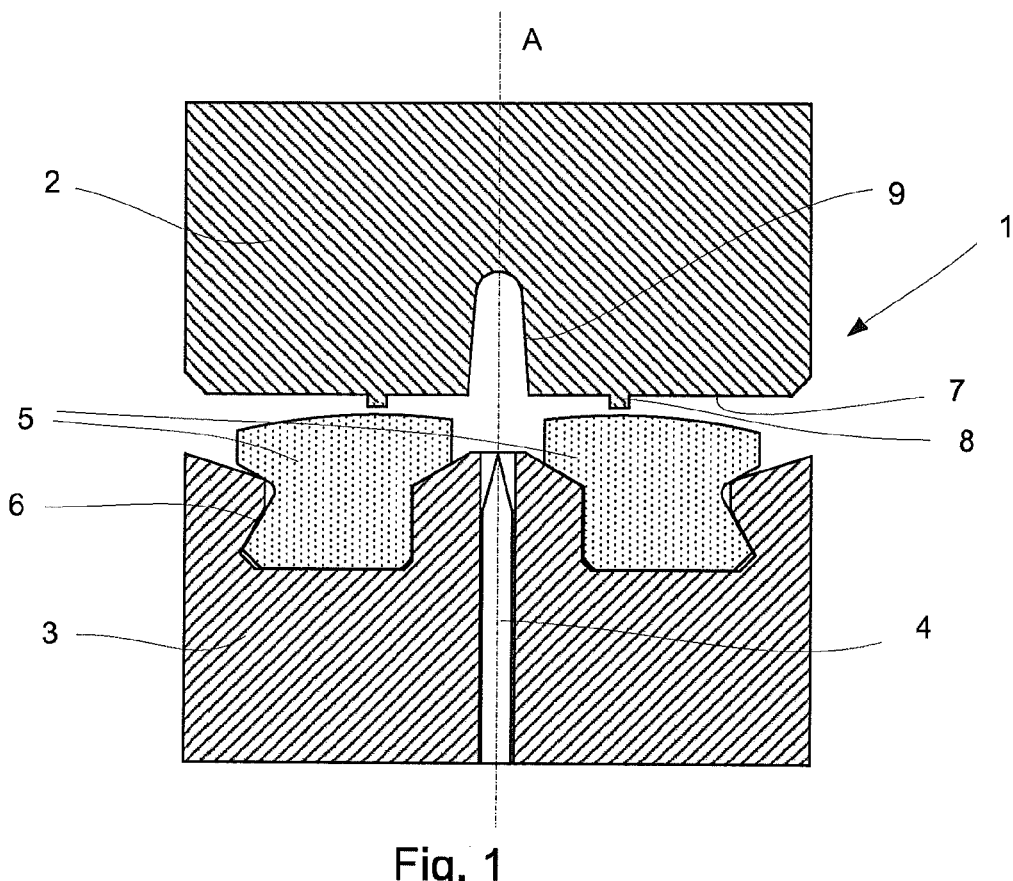
FIG. 1 is a schematic sectional view of a heat-sealing device according to the invention.

The pressure pad according to the present invention is intended for a heat-sealing device 1 that can be seen schematically in FIG. 1. Such a heat-sealing device is typically used in form, fill and seal-machines where it is used to seal and cut a tube of packaging material between consecutive bags/packages in order to produce individual bags/packages. The heat-sealing device comprises a heating jaw 2 and a counter jaw 3. In use, they will be brought together such that two sides of the packaging material are heat-sealed together for forming a tight seal. Both the heating jaw 2 and the counter jaw 3 are symmetrical in relation to an intermediate plane A, being perpendicular to the general sealing plane of the heating jaw 2 and arranged at the centre of the heating jaw 2 and counter jaw 3.

The heat-sealing device further comprises a knife 4, which sits in a slot in the counter jaw 3 and moves along the plane A. The counter jaw is equipped with two pressure pads 5, or sealing dollies, being mounted into grooves 6 in the counter jaw 3, one on each side of the intermediate plane A of the counter jaw 3.

The heating jaw 2 has two flat sealing surfaces 7, each provided with a protrusion 8. A slit 9 is further provided in the heating jaw 2, for receiving the knife 4 during cutting of the packaging material.

Figure 2:
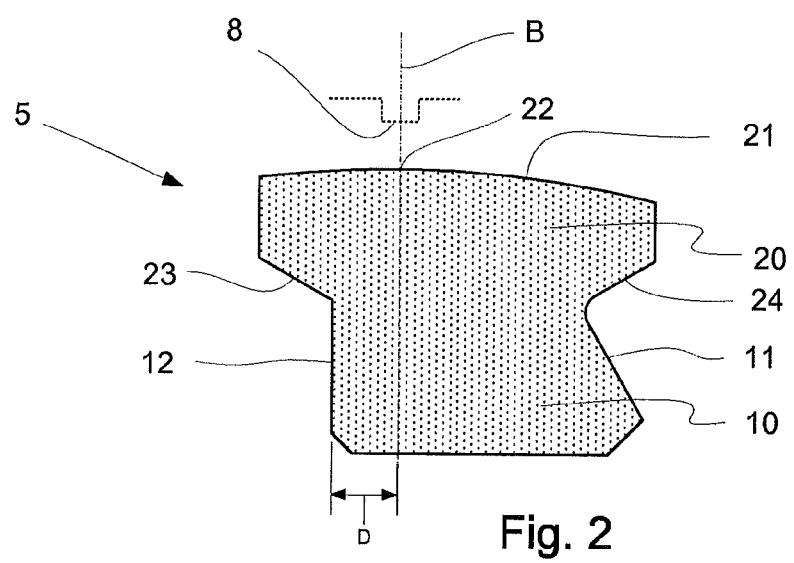
FIGS. 2 to 5 are sectional views of pressure pads according to different embodiments of the invention.

In FIG. 2, the pressure pad 5 is shown in more detail in a sectional view. The pressure pad 5 comprises a first portion 10, intended to be mounted in the groove 6 in the counter jaw 3, and a second portion 20, which in use is arranged towards the heating jaw 2. The second portion 20 has an outer contact surface 21, having a maximum projection point 22. The maximum projection point 22 forms a maximum projection line, as the pressure pad extends into the drawing. The pressure pad 5 also has two surfaces 23, 24 that face away from the outer contact surface 21, and which are provided to abut outer surfaces of the counter jaw 3, just outside the groove 6. These surfaces 23, 24 are angled upward, from the first portion 10, and are arranged to absorb at least a part of the sealing force.

The first portion 10 of the pressure pad 5 has a first lateral surface 11, in use facing away from the intermediate plane A of the counter jaw 3. This first lateral surface 11 is angled towards the plane A, as seen from the bottom of the first portion. The first portion 10 also has a second lateral surface 12, in use facing towards the intermediate plane A of the counter jaw 3. The second lateral surface 12 is parallel to the intermediate plane A of the counter jaw 3. Together, the first 11 and second 12 lateral surfaces create a wedge-shaped first portion 10 that in use keeps the pressure pad in place inside an inversely shaped groove 6.

In the embodiment shown in FIGS. 1 and 2, the outer contact surface 21 has a constant radius of curvature of about 15 mm. This has been shown, in tests, to be an optimal radius for displacing particles from the sealing zone, while being gentle on the packaging material. Furthermore, in the shown embodiment, the maximum projection point or line 22 is arranged to coincide with the protrusion 8 on the heating jaw 2. This is clearly shown in FIG. 2, where the protrusion 8 of the heating jaw 2 is shown with dashed lines. This has been shown to provide better displacement of some particles from the sealing zone.

Figure 3:
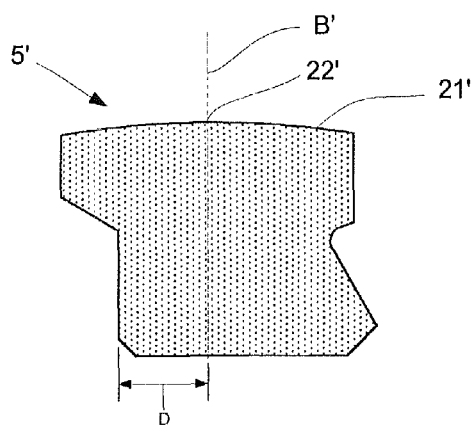
Figure 4:
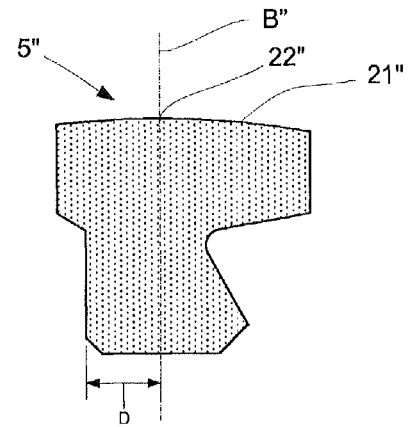

In FIGS. 3 and 4, alternative embodiments of pressure pads 5', 5" are shown. These embodiments also have a constant radius of curvature of about 15 mm of the outer contact surfaces 21', 21", and a maximum projection point or line 22', 22" which is arranged to coincide with a protrusion of a heating jaw (not shown).

It can be seen that the distances from the second lateral surface 12, 12', 12" and a plane B, B', B", parallel to the intermediate plane A and running through the maximum projection point or line 22, 22', 22", differ between the three embodiments. This is a consequence of the location of the maximum projection point or line 22, 22', 22" being arranged to coincide with the centre of the protrusion of a corresponding heating jaw 2. The placement of the protrusion 8 on the heating jaw 2 is not the same in all heating jaws, which necessitates having different pressure pads 5.

In FIGS. 1 to 5, a pressure pad 5 is shown having an angled first lateral wall 11. This angle provides a secure lock of the pressure pad 5 inside the groove 6 of the counter jaw 3, and this is desirable in some high-speed applications. The angle α is around 30°.

Figure 5:
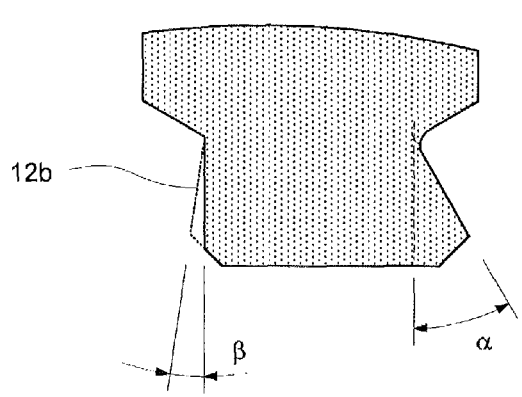

In FIG. 5, an angled second lateral surface 12b is shown with dashed lines. This angled wall provides an even more secure lock of the pressure pad 5 inside the groove 6, and it can be provided for all the different embodiments. The angle β of this wall is around 10°.

Figure 6:
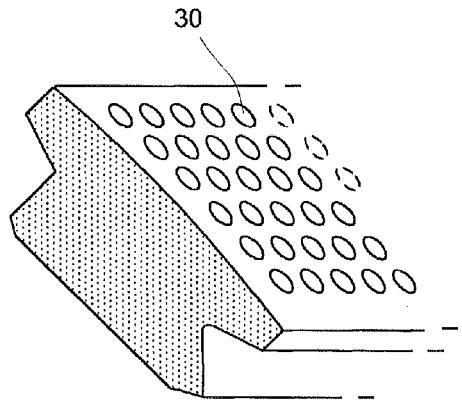
FIG. 6 is a perspective view of a pressure pad according to one embodiment of the invention.

In FIG. 6, the outer contact surface 21 is shown for a pressure pad 5 according to one embodiment of the invention. As can be seen, the outer contact surface may be provided with discrete indentations 30, each having an almost circular circumference. These indentations serve to maintain a fluid in the vicinity of the sealing zone, between the pressure pad 5 and the outside of the packaging material, since this has been shown to improve the sealing operation. Different types of indentations are possible, as long as they can maintain or hold a fluid or liquid in the sealing zone. These indentations 30 may cover the entire area, or only a central area in the vicinity of the maximum projection line 22.

In alternative embodiments, the radius of curvature of the outer contact surface (21, 21', 22") is 15 mm±4 mm, or 15 mm±3 mm, or 15 mm±2 mm, or 15 mm±1 mm. Even though outer contact surfaces (21, 21', 21") having constant radius of curvature is shown, it is of course possible to have a varying radii, as long as the overall outer surface has a general, average radius of curvature that falls within the above ranges.

The outer contact surface (21, 21', 21") is normally the projection into the drawing (as seen in FIGS. 2 to 5) of the curved line indicated with the reference no. 21, 21', 21". However, it is also possible that the outer contact surface slightly deviates from a perfect straight projection, and may be curved slightly along its longitudinal direction, in order to, in use, coincide with a similarly curved protrusion 8 of a heating jaw 2 (not shown). However, the pressure pads 5 of the present invention is normally made of a relatively resilient material, so even a straight pressure pad might be able to fit into a curved groove 8 of a counter jaw 3.

The term arc-shaped surface is used to describe the outer contact surface, since it is arc-shaped in all cross-sections, at least in the part intended to contact the heating jaw 2. This arc-shaped surface is in fact a part of a cylindrical surface, where the top of the pressure pad 5 forms a cylinder segment.

The invention claimed is:

1. Pressure pad for a heat-sealing device in a packaging machine, the heat-sealing device having a heat-sealing jaw and a counter-jaw adapted to seal together two surfaces of a packaging material when the jaws are pressed together, said pressure pad comprising:
   a first portion, adapted to be mounted on the counter-jaw of the heat-sealing device;
   a second portion, in use arranged towards the heat-sealing jaw of the heat-sealing device, a cross-section of said second portion, along the extension of the pressure pad, having a substantially constant arc-shaped outer contact surface in use facing the heat-sealing jaw;
   said pressure pad being made up of a resilient material;
   said cross-section of said arc-shaped outer contact surface possessing a radius of curvature of 15 mm±5 mm; and
   the second portion of the pressure pad being configured such that a maximum projection point or line of the arc-shaped outer contact surface coincides with a protrusion of the heat-sealing law.

2. Pressure pad according to claim 1, wherein the arc-shaped outer contact surface is provided with discrete indentations.

3. Pressure pad according to claim 1, wherein the first portion is adapted to be mounted in a groove of the counter jaw.

4. Pressure pad according to claim 1, wherein a first lateral surface of the first portion of the pressure pad, in use facing away from an intermediate plane of the heat-sealing device, is angled towards said plane, as seen from a base of the pressure pad, said angle being about 30°.

5. Pressure pad according to claim 1, wherein a second lateral surface of the first portion of the pressure pad, in use facing towards an intermediate plane of the heat-sealing device, is parallel to said intermediate plane of the heat-sealing device.

6. Pressure pad according to claim 1, wherein a second lateral surface of the first portion of the pressure pad, in use facing towards an intermediate plane of the heat-sealing device, is angled away from said plane as seen from the base of the pressure pad, said angle being about 10°.

7. Pressure pad according to claim 1, wherein the cross-section of the outer contact surface has a constant radius of curvature.

8. Pressure pad according to claim 1, wherein the outer contact surface has a radius of curvature of 15 mm±4 mm.

9. Heat-sealing device having a pressure pad according to claim 1.

10. Pressure pad according to claim 1, wherein the outer contact surface has a radius of curvature of 15 mm±3 mm.

11. Pressure pad according to claim 1, wherein the outer contact surface has a radius of curvature of 15 mm±2 mm.

12. Pressure pad according to claim 1, wherein the outer contact surface has a radius of curvature of 15 mm±1 mm.

* * * * *